US005797096A

United States Patent [19]

Lupien et al.

[11] Patent Number: 5,797,096
[45] Date of Patent: Aug. 18, 1998

[54] SYSTEM AND METHOD FOR MAINTAINING CONTROL CHANNEL MODE INFORMATION IN A CELLULAR TELECOMMUNICATIONS NETWORK

[75] Inventors: Francis Lupien, Montreal; Francois Sawyer, St-Hubert, both of Canada

[73] Assignee: Telefonaktiebolaget LM Ericsson (publ), Stockholm, Sweden

[21] Appl. No.: 510,558

[22] Filed: Aug. 2, 1995

[51] Int. Cl.⁶ .................................... H04Q 7/38
[52] U.S. Cl. ............... 455/433; 455/435; 455/466; 455/414; 455/553
[58] Field of Search .................. 455/435, 466, 455/433, 445, 414, 552, 553, 515

[56] References Cited

U.S. PATENT DOCUMENTS

| | | | |
|---|---|---|---|
| 4,955,083 | 9/1990 | Phillips et al. | 455/47 |
| 5,212,684 | 5/1993 | MacNamee et al. | 370/24 |
| 5,335,355 | 8/1994 | Tanaka et al. | 455/33.1 |
| 5,420,911 | 5/1995 | Dahlin et al. | 379/59 |
| 5,493,693 | 2/1996 | Tanaka et al. | 455/553 X |
| 5,561,840 | 10/1996 | Alvesalo et al. | 455/433 |
| 5,561,854 | 10/1996 | Antic et al. | 455/433 |
| 5,577,103 | 11/1996 | Foti | 455/414 X |
| 5,621,784 | 4/1997 | Tiedemann, Jr. et al. | 455/435 |

*Primary Examiner*—Reinhard J. Eisenzopf
*Assistant Examiner*—Philip J. Sobutka
*Attorney, Agent, or Firm*—Steven W. Smith

[57] ABSTRACT

A system and method for maintaining control channel mode (CCM) status information for a mobile station in a cellular telecommunications network having a mobile switching center (MSC) and a plurality of base stations and cells. Following reselection of a new cell by the mobile station, or selection of a new analog or digital operating mode, the system notifies the MSC of the mobile station's identity, current CCM, and a base station identification. The MSC stores the CCM information and utilizes it for paging and for delivery of short message service (SMS) messages when the control channel is digital. The MSC also transmits the CCM information to a home location register (HLR) whenever the CCM changes. Upon loss of the CCM status information by the MSC, if an incoming call is received for the mobile station prior to a registration by the mobile station, the system retrieves the assigned CCM status information from the HLR.

12 Claims, 8 Drawing Sheets

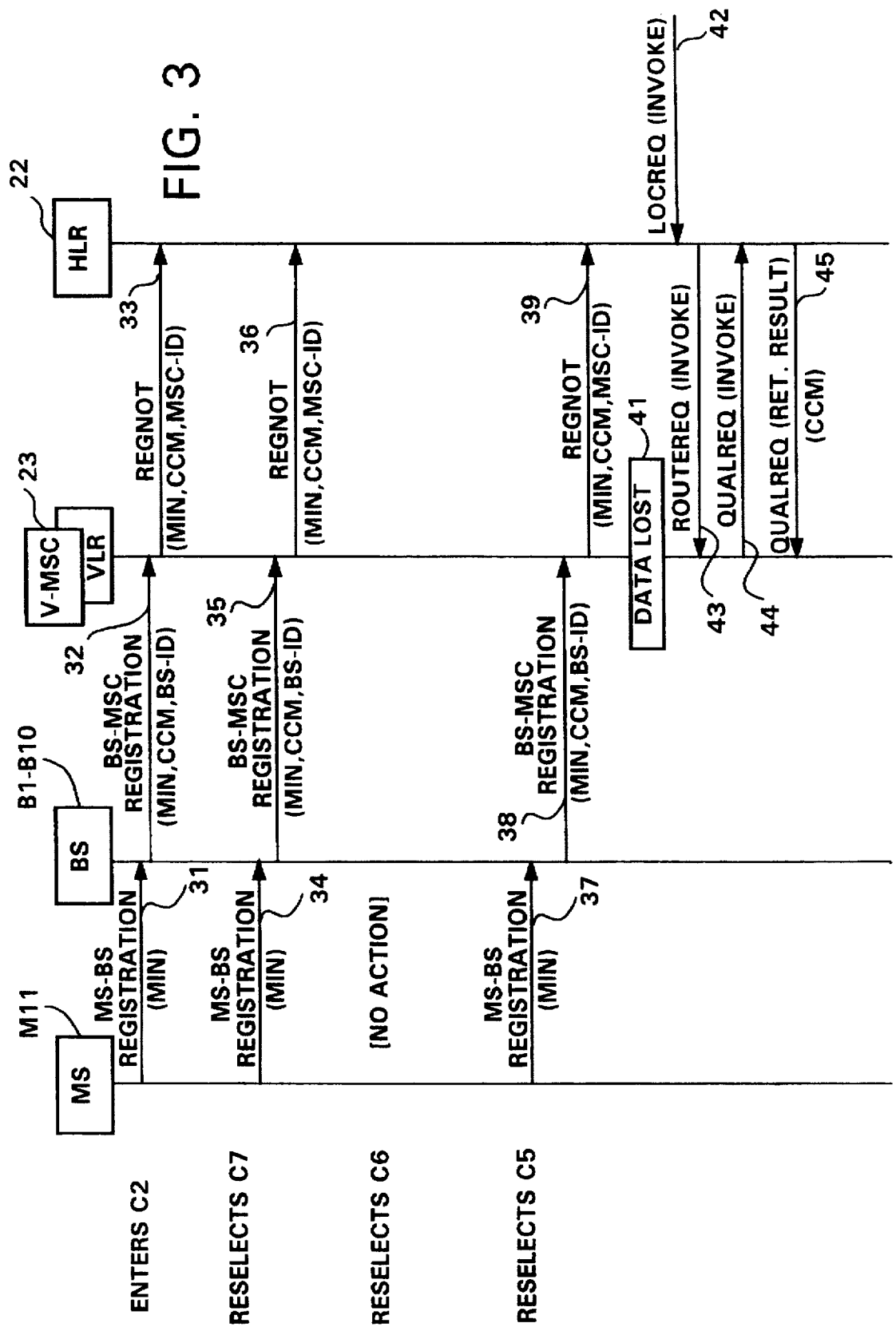

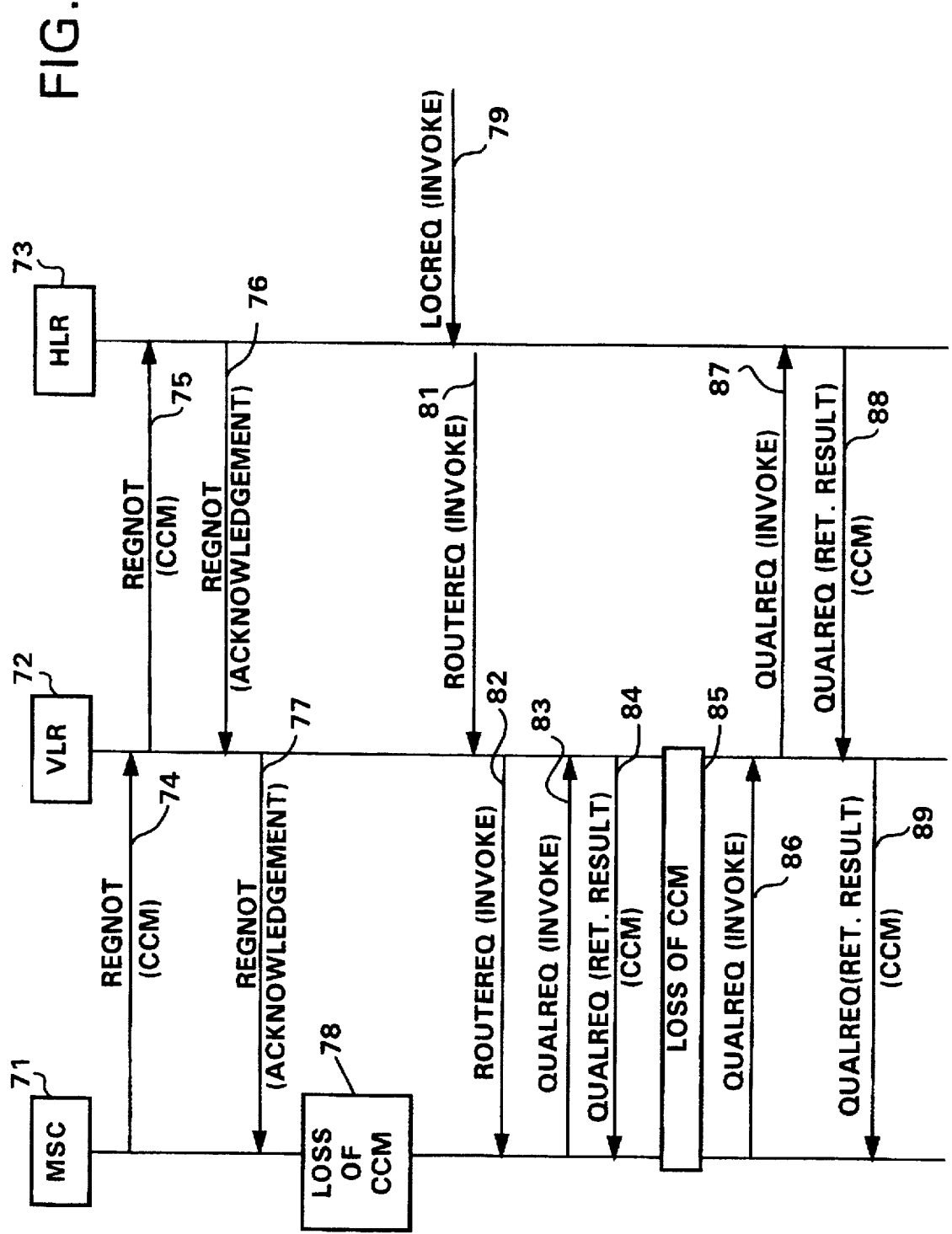

SYSTEM AND METHOD FOR MAINTAINING CONTROL CHANNEL MODE INFORMATION IN A CELLULAR TELECOMMUNICATIONS NETWORK

BACKGROUND OF THE INVENTION

1. Technical Field of the Invention

The present invention relates to a cellular telecommunications network, and more particularly, to a system for maintaining status information relating to the control channel mode of digital and analog mobile stations.

2. Description of Related Art

In modern cellular telecommunications networks, many network operators offer digital service in order to relieve analog congestion in the network and/or to provide new services such as short message service (SMS) signaling. Mobile stations operating in the digital mode utilize a digital control channel (DCC) while mobile stations operating in the analog mode utilize an analog control channel (ACC). Some mobile stations are capable of operating in either analog or digital, and subscribers may choose their operating mode as analog only, digital only, or a dual mode which is capable of operating in either analog or digital. If the dual mode is chosen, and both analog and digital channels are available, digital service is generally preferred in order to reduce congestion on the network's analog channels.

When a mobile station registers in a cellular telecommunications network, the mobile station's mobile identification number (MIN) is transmitted to a serving base station. The base station forwards the registration message to a mobile switching center (MSC) responsible for the area of the network in which the mobile station is located. The base station includes the mobile station's MIN, its control channel mode (CCM), and a base station identification (BS-ID) in the registration message. The CCM indicates whether the mobile station is operating on an analog or a digital control channel. The CCM may be an explicit parameter in the registration message or may be implicitly determined by the MSC based upon the messaging format being utilized. For clarity, the CCM is illustrated herein as an explicit parameter. The CCM information is stored in the MSC, and is utilized to ensure paging is performed on the correct type of control channel, and if the CCM is digital, to deliver SMS messages. When accurate information about the mobile station's mode is not available, the CCM is indicated as "unknown". The CCM is stored at initial registration, and at call originating accesses and page responses if the call is successfully set up, and the mobile station is not yet registered (i.e., the CCM is unknown). The CCM is updated in the MSC whenever the mobile station changes its CCM.

DCCs may be deployed non-homogeneously in a cellular telecommunications network or between networks. Thus, as a mobile station roams around its service area, it may pass from cells serviced by ACCs to cells serviced by DCCs. When a DCC becomes available, the mobile station may change its CCM to utilize the digital services available such as SMS messaging. At that time, the mobile station re-registers with the network, and the new CCM is stored in the MSC. Thus, during a roaming period, a valid registration access from the mobile station may be reported on a control channel of a different type from that of the known CCM. Therefore, the MSC must monitor the changes in the control channel type to which the roaming mobile station is tuned.

In some cases, however, the MSC may lose the mobile station's CCM status information. This loss of information may result from several different causes. For example, the memory storage capacity of the MSC may be exceeded. If so, the CCM status information of additional mobile stations, and updates of the CCM information for known mobile stations, is not stored. Also, if the MSC suffers a failure and has to be restarted, then dynamic data such as mobile station MIN and CCM information is lost and must be restored.

In the event that mobile station CCM status information is lost, the MSC has no information regarding whether the mobile station is operating on an analog or a digital control channel. At that point, if a call is made to the mobile station, the MSC must page for the mobile station on both the DCC and the ACC in order to restore the CCM status information. If the mobile station's CCM is unknown, then the MSC may, for example, page first on the DCC and then on the ACC because of the greater system capacity on the digital channel. Regardless of the mobile station's mode of operation, network resources are wasted because of the loss of the status information and the resulting process required to restore it.

There are no known prior art teachings of a solution to the aforementioned deficiency and shortcoming such as that disclosed herein. It would be a distinct advantage to have a telecommunications network capable of maintaining and rapidly restoring CCM status information when the MSC loses CCM data stored therein. The present invention provides such a network.

SUMMARY OF THE INVENTION

In one aspect, the present invention is a method of maintaining control channel mode (CCM) status information for a mobile station in a cellular telecommunications network having a mobile switching center (MSC) and a plurality of cells. The method comprises the steps of storing the CCM status information in the MSC, storing the CCM status information in a home location register (HLR), determining whether the CCM status information has been lost by the MSC, receiving an incoming call for the mobile station, determining whether the incoming call was received after the CCM status information was lost by the MSC, and retrieving the CCM status information from the HLR upon determining that the CCM status information was lost by the MSC, and that the incoming call was received after the CCM status information was lost and before the CCM status information has been restored to the MSC by a registration message from the mobile station.

In another aspect, the present invention is a system for maintaining control channel mode (CCM) status information for a mobile station in a cellular telecommunications network having a mobile switching center (MSC) and a plurality of cells. The system comprises means for storing the CCM status information in the MSC, means for storing the CCM status information in a home location register (HLR), means for determining whether the CCM status information has been lost by the MSC, and means for retrieving the CCM status information from the HLR, upon determining that the CCM status information has been lost by the MSC. Finally, the system includes means for retrieving from the HLR, the CCM status information, upon loss of the CCM status information by the MSC.

In still another aspect, the present invention is a method of delivering a short message service (SMS) message to a mobile station in a cellular telecommunications network having a mobile switching center (MSC), a home location register (BLR), and a message center (MC). The method begins by storing in the HLR, a current control channel mode (CCM) indicating whether the mobile station is operating on a digital control channel or an analog control channel. The SMS message for the mobile station is then received at the MC, and a request for the mobile station's CCM is transmitted from the MC to the HLR. The CCM is then transmitted from the HLR to the MC. When the CCM indicates that the mobile station is not operating on a digital control channel, the method stores the SMS message in the MC, and when the CCM indicates that the mobile station is operating on a digital control channel, the method transmits the SMS message to said MSC for delivery to the mobile station.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIG. 3 is a message flow diagram illustrating the messages sent and received between the mobile switching center (MSC) and a home location register (HLR) in the preferred embodiment of the present invention;

FIG. 7 is a message flow diagram illustrating the messages sent and received between a mobile switching center, a visitor location register, and a home location register when a mobile station roams into a visited system in the preferred embodiment of the present invention.

DETAILED DESCRIPTION OF EMBODIMENTS

Figure 1:
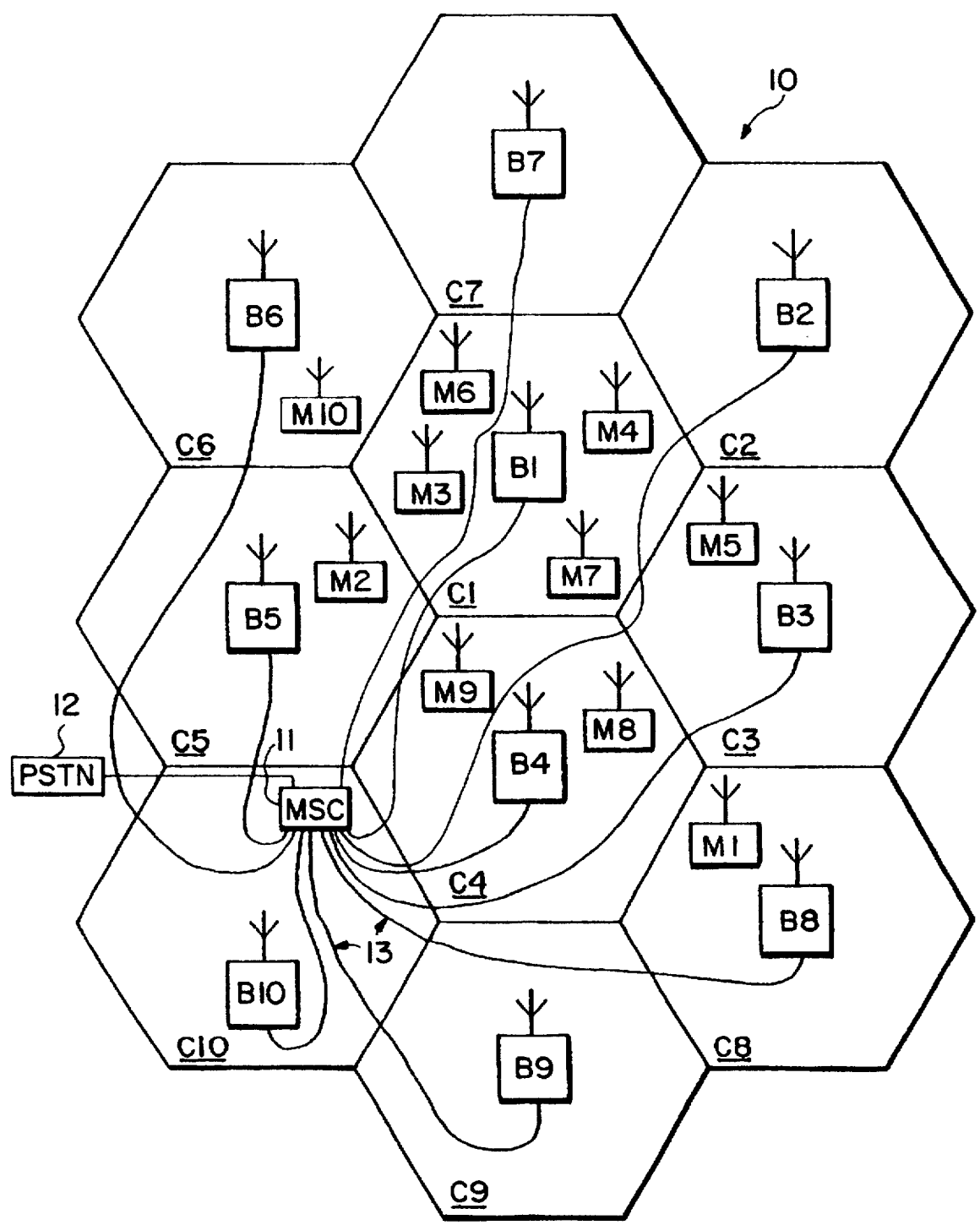
FIG. 1 is a block diagram illustrating components of a cellular radio telecommunications network associated with the present invention.

Referring first to FIG. 1, there is illustrated a conventional cellular radio telecommunications network 10 of the type to which the present invention may generally pertain. In FIG. 1, an arbitrary geographic area may be divided into a plurality of continuous radio coverage areas, or cells C1–C10. Although the network of FIG. 1 is illustratively shown to only include 10 cells, it should be clearly understood that in practice, the number of cells could be much larger.

Associated with and located within each of the cells C1–C10, is a base station designated as a corresponding one of a plurality of base stations B1–B10. Each of the base stations B1–B10 includes a transmitter, receiver, and a base station controller as are well known in the art. In FIG. 1, the base stations B1–B10 are selected to be located at the center of each of the cells C1–C10, respectively, and are equipped with omni-directional antennas. However, in other configurations of a cellular radio network, the base stations B1–B10 may be located near the periphery, or otherwise away from the centers of the cells C1–C10 and may illuminate the cells C1–C10 with radio signals either omni-directionally or directionally. Therefore, the representation of the cellular radio network of FIG. 1 is for purposes of illustration only and is not intended as a limitation on the possible implementations of a system for maintaining CCM information in a mobile radio telecommunications network.

With continuing reference to FIG. 1, a plurality of mobile stations M1–M10 will be found within the cells C1–C10. Again, only ten mobile stations are shown in FIG. 1, but it should be understood that the actual number of mobile stations will be much larger and, in practice, will invariably greatly exceed the number of base stations. Moreover, mobile stations M1–M10 are illustrated in some of the cells C1–C10. The presence or absence of mobile stations in any particular one of the cells C1–C10 should be understood to depend, in practice on the individual desires of subscribers utilizing the mobile stations M1–M10. Subscribers may roam from one location in a cell to another, or from one cell to an adjacent cell or neighboring cell, and even from one cellular radio network served by a mobile switching center (MSC) 11 to another such network all the while receiving and placing calls both within the cellular network 10 as well as the public switch telecommunication network (PSTN) 12 which is connected to the MSC 11. Although not shown in FIG. 1, the MSC 11 may also have associated with it a home location register (HLR) which may be physically separate or connected to the MSC. The HLR serves as a database of subscriber information for roaming subscribers. The HLR contains all the mobile subscriber data, such as subscriber identity, supplementary services, bearer services, and location information necessary to route incoming calls. The HLR may be shared by a group of MSC's. Networks employing ditgital services may also include a message center (MC) (not shown) for storage and routing of short message service (SMS) messages.

Each of the mobile stations M1–M10 is capable of initiating or receiving a telephone call through one or more of the base stations B1–B10 and the MSC 11. Such calls may be either for voice or data communications. The MSC 11 is connected by communication links 13 (e.g., cables) to each of the illustrative base stations B1–B10 and the PSTN 12 or a similar fixed network which may be include an integrated services digital network (ISDN) facility (not shown). The relevant connections between the MSC 11 and the base stations B1–B10, or between the MSC 11 and the PSTN 12, are not completely shown in FIG. 1 but are well known to those of ordinary skill in the art. Similarly, it is also known to include more than one mobile switching center (MSC) in the cellular radio network and to connect each additional MSC to a different group of base stations and to other MSCs via cables or radio links.

Each of the cells C1–C10 is allocated a plurality of voice or speech channels and at least one access or control channel, such as a forward control channel (FOCC). The control channel is used to control or supervise the operation of the mobile station by means of information transmitted and received from those units, referred to as messages. Control and administration messages within a cellular radio network are sent in accordance with industry established air interface standards, such as EIA/TIA 553, the standard for analog cellular operations, and/or EIA/TIA 627 (formerly IS-54B) and IS-136, the standards for digital cellular operations, all of which are hereby incorporated by reference herein. Integrated services between different cellular telecommunication systems are provided by using the intersystem specification IS-41, which is hereby incorporated by reference herein. While these standards govern North American operations, similar standards govern other geographic areas throughout the world, and are well known to those skilled in the art.

The information exchanged between base stations and mobile stations via messages, may include incoming call signals, outgoing call signals, paging signals, paging response signals, location registration signals, voice channel assignments, maintenance instructions, SMS messages, and handoff instructions as the mobile stations travel out of the radio coverage of one cell and into the radio coverage of other cells, as well as other additional items of information such as calling party numbers, time information, and the like. The control or voice channels may operate in either analog or digital mode based upon industry standards.

As noted above, when a mobile station registers in a cellular telecommunications network, the MSC is informed by the serving base station of the mobile station's corresponding mode of operation (i.e., whether the mobile station is operating in an analog or a digital mode), and this information is stored in the MSC as the mobile station's control channel mode (CCM). The CCM is utilized to ensure paging is performed on the correct type of control channel, and if the CCM is digital, to deliver SMS messages. If the memory storage capacity of the MSC is exceeded, or a failure and restart of the MSC causes loss of the mobile station's CCM status information, the MSC has no information regarding whether the mobile station is operating on an analog or a digital control channel. At that point, if there is a call for the mobile station, the MSC must page for the mobile station on both the ACC and the DCC in order to complete the call. Network resources are wasted because of the loss of the CCM status information and the resulting process requiring the MSC to page on both the ACC and the DCC when there is a call to be delivered.

The present invention implements a process whereby mobile station CCM status information is updated and stored in a device that is functionally independent of the MSC whenever the CCM changes. In the preferred embodiment, this device is a home location register (HLR) associated with, but functionally independent of, the MSC. A series of messages are implemented to report and update this status information, and provide for rapid restoration of CCM status information in the event such information is lost by the MSC. In the preferred embodiment, these messages are presented in IS-41 format although other communications protocols could also be utilized.

Figure 2:
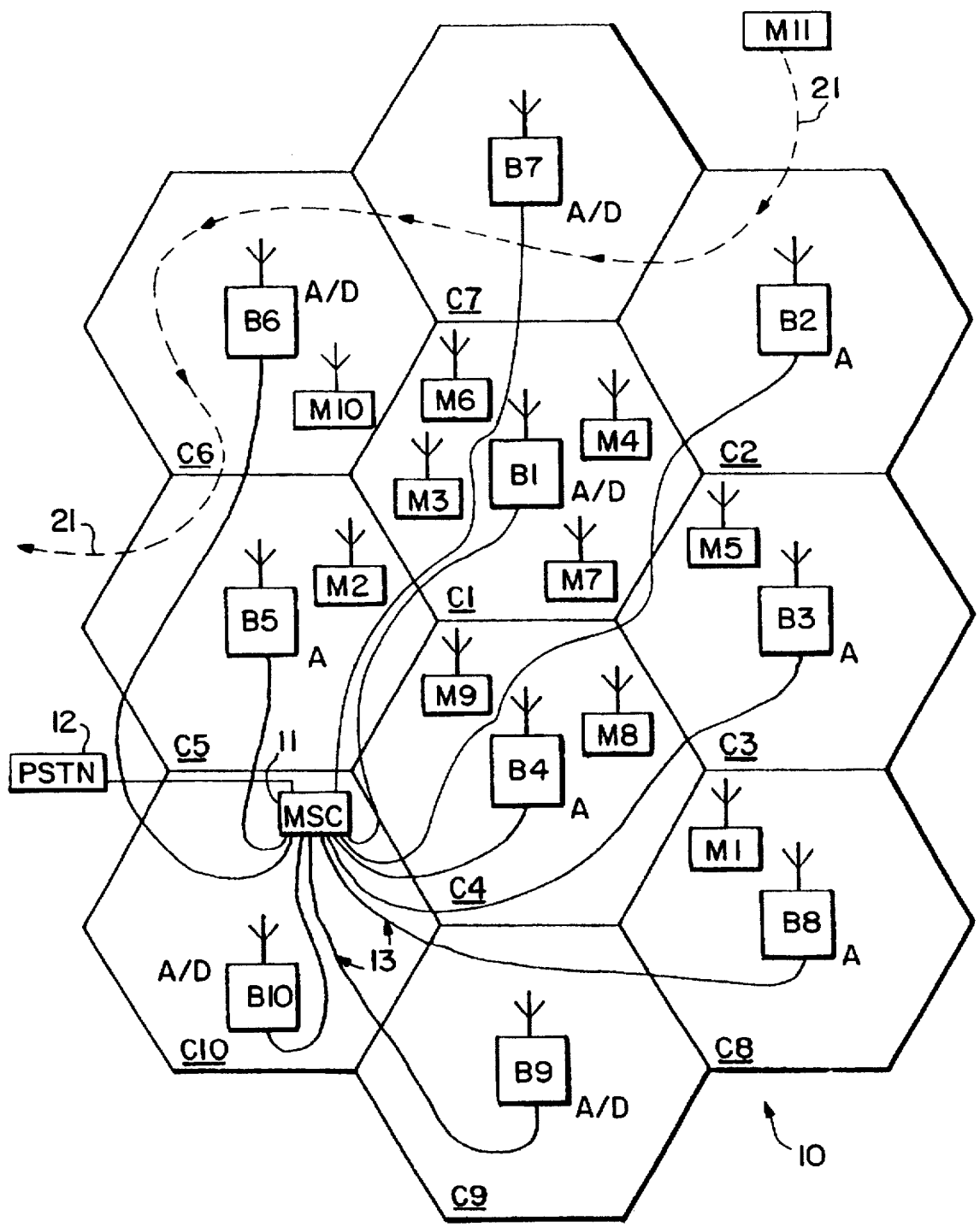
FIG. 2 is a block diagram illustrating the cellular radio telecommunications network of FIG. 1, including indications of the analog or digital capability of each cell and illustrating the track of a roaming mobile station.

FIG. 2 is a block diagram illustrating the cellular radio telecommunications network of FIG. 1, including indications of the availability of analog or digital control channels in each cell and illustrating a track 21 of a roaming mobile station M11. The roaming mobile station M11 is a dual-mode mobile station capable of both analog and digital operation. The cellular network 10 is shown with a non-homogeneous distribution of digitally capable cells. By way of example, the roaming mobile station M11 is shown to enter the service area of the MSC 11 through cell C2 (analog only) and thereafter travel through cells C7 (analog and digital), C6 (analog and digital), and C5 (analog only) before departing the service area. The message flow during this process is illustrated in FIG. 3.

FIG. 3 is a message flow diagram illustrating the messages sent and received between the mobile station M11, the serving base station B1–B10, a co-located MSC and visitor location register (VLR) (i.e., V-MSC) 23, and the home location register (HLR) 22 in the preferred embodiment of the present invention. As the mobile station M11 enters cell C2, in which only analog control channels are available, it switches to analog mode and sends a MS-BS registration message 31 to base station B2. The MS-BS registration message includes the mobile station's MIN. The registration message 31 may also occur as an origination or a page response. The base station B2 transmits a BS-MSC registration message 32 to the V-MSC 23 and includes the mobile station's MIN, the CCM on which the mobile station is being controlled, and a base station identification (BS-ID). Since cell C2 has only analog control channels available, the mobile station M11 operates in analog mode and the CCM indicates "analog". The VMSC 23 stores the CCM of the mobile station in an internal memory. The V-MSC 23 then sends a Registration Notification (RegNot) message 33 to the HLR 22. The RegNot message 33 includes the mobile station's MIN, its CCM, and a MSC identification (MSC-ID) which tells the HLR which MSC is sending the message since the HLR may be associated with a group of MSCs. The CCM indicates that the mobile station M11 is currently operating in the analog mode. Any time that the mobile station selects a different CCM mode, the mobile station repeats the registration with the network, and the new CCM is stored in both the V-MSC 23 and the HLR 22.

As the mobile station M11 roams into cell C7, the mobile station autonomously reselects cell C7. Since the mobile station M11 preferentially operates in the digital mode when a DCC is available, the mobile station M11 changes its CCM to digital and sends its MIN in a MS-BS registration message 34 to base station B7. Base station B7 sends BS-MSC registration message 35 to the V-MSC 23 and includes the mobile station's MIN, its new CCM, and the base station identification (BS-ID). The V-MSC 23 then sends a Registration Notification (RegNot) message 36 to the HLR 22. The RegNot message 36 includes the mobile station's MIN, its new CCM, and a MSC identification (MSC-ID). The CCM indicates that the mobile station M11 is currently operating in the digital mode.

As the mobile station M11 roams into cell C6, the mobile station autonomously reselects cell C6. Cell C6 has both analog and digital control channels available. Therefore, the mobile station M11 remains in digital mode. Since there is no change to its CCM, no registration message is sent, and the V-MSC 23 and HLR 22 retain the CCM information already stored there.

Cell C5 in this example has only analog control channels available, and as the mobile station M11 reselects cell C5, it changes its CCM to analog and sends a MS-BS registration message 37 with its MIN to base station B5. Base station B5 sends BS-MSC registration message 38 to the V-MSC 23 and includes the mobile station's MIN, its new CCM, and the base station identification (BS-ID). The V-MSC 23 then sends a RegNot message 39 to the HLR 22. The RegNot message 39 includes the mobile station's MIN, its new CCM, and a MSC identification (USC-ID). The CCM indicates that the mobile station M11 is currently operating in the analog mode.

In this manner, the HLR 22 is continuously updated with the latest CCM status information for the mobile station M11. If, at any time during this roaming sequence, the V-MSC 23 loses the CCM status information, and a call needs to be delivered to the mobile station, the V-MSC rapidly retrieves the latest CCM information from the HLR 22 and pages for the mobile station on the proper control channel type. This eliminates the necessity to page the mobile station on both the ACC and the DCC in order to complete the call.

The process of retrieving CCM data from the HLR 22 and restoring it to the V-MSC 23 is illustrated by the remaining messages in FIG. 3. At 41, the V-MSC 23 loses CCM data on the mobile station M11 operating in its service area. If there are no incoming calls for mobile station M11, the V-MSC takes no action, but waits for the next registration by the mobile station. The registration message includes the CCM of the mobile station and restores this information to the V-MSC.

If there is an incoming call for the mobile station M11 before the next registration, then the V-MSC 23 must retrieve the CCM information from the HLR 22. In the preferred embodiment illustrated in FIG. 3, a Location Request (Invoke) message 42 representing an incoming call for the mobile station M11 is received at the HLR 22. The HLR transmits a Route Request (Invoke) message 43 to the V-MSC requesting that the V-MSC page and locate the mobile station M11. However, the V-MSC is lacking the CCM information for the mobile station. Therefore, the V-MSC 23 sends a Qualification Request (Invoke) message 44 to the HLR which requests CCM information for the mobile station. The HLR then returns a Qualification Request (Return Result) message 45 to the VMSC and includes the CCM of the mobile station.

Alternatively, the HLR may include the CCM of the mobile station M11 in the Route Request (Invoke) message 43. This eliminates the need for the Qualification Request messages 44 and 45, however, this method is not preferred since the CCM information uses valuable space in the Route Request message and is not needed if the V-MSC already has the CCM information.

Figure 4A:
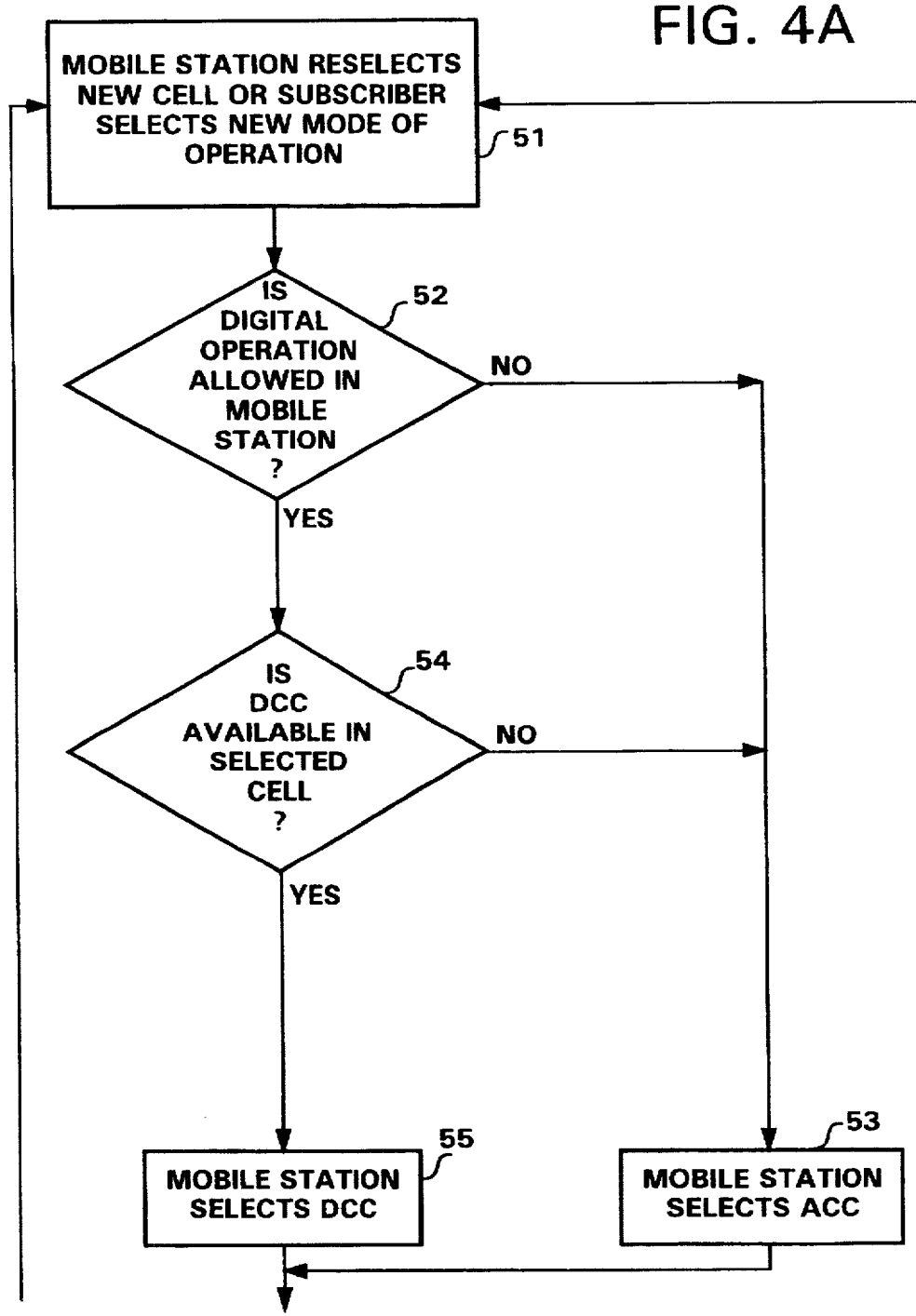
FIGS. 4A and 4B are a flow chart illustrating the functions performed by a control program in the preferred embodiment of the present invention.
Figure 4B:
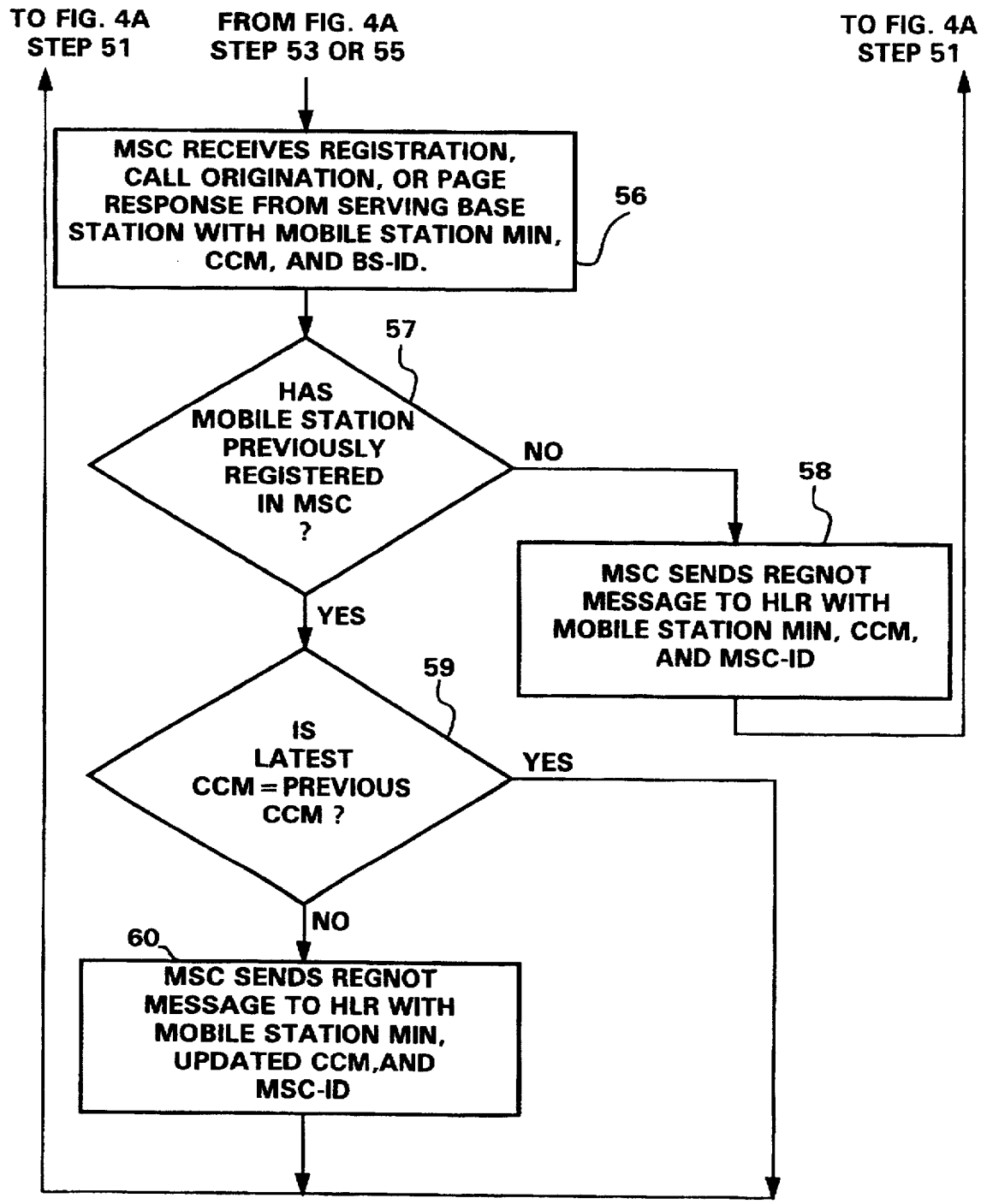

FIGS. 4A and 4B are a flow chart illustrating the functions performed by a control program in the preferred embodiment of the present invention. The program begins at FIG. 4A, step 51 where the mobile station M11 reselects a new cell or the mobile subscriber selects a new mode of operation (i.e., analog, digital, or dual mode) on the mobile station M11. At step 52, it is determined whether or not digital operation is allowed in the mobile station M11. The mobile station may be analog only, digital only, or dual capable, and the subscriber may manually switch between the modes. If digital operation is not allowed in the mobile station (e.g., the subscriber has switched to analog mode), the program moves to step 53 where the mobile station selects an analog control channel (ACC). If, at step 52 it is determined that digital operation is allowed in the mobile station M11, the program moves to step 54 where it is determined whether or not a DCC is available in the selected cell. If a DCC is not available in the selected cell, the program moves to step 53 where the mobile station selects an ACC. If, at step 54 it is determined that a DCC is available, the program moves to step 55 where the mobile station selects a DCC. The program then moves to FIG. 4B, step 56.

At step 56, the MSC 11 receives a registration, call origination, or page response message from the base station serving the mobile station M11. The message includes the mobile station's MIN, the CCM of the mobile station, and a base station identification (BS-ID). At step 57, the program determines whether or not the mobile station has previously registered in the MSC 11 (i.e., is the registration message the first registration message from the mobile station in the MSC 11). If the mobile station has not previously registered, the program moves to step 58 where the MSC 11 sends a Registration Notification (RegNot) message to an associated HLR 22 with the mobile station's MIN and the mobile station's CCM. The RegNot message also includes an MSC identification (MSC-ID) since the HLR may service a group of MSCs. The program then returns to step 51 (FIG. 4A). If, however, it is determined at step 57 that the mobile station previously registered in the MSC, the program moves to step 59 where the MSC 11 determines whether or not the latest CCM data obtained from the latest registration, call origination, or page response is equal to previously stored CCM data for the mobile station. If the latest CCM data is equal to the previously stored CCM data, no action is taken, and the program returns to step 51 (FIG. 4A). If, however, it is determined at step 59 that the latest CCM data is not equal to the previously stored CCM data, then the program moves to step 60 where the MSC 11 sends a RegNot message to the HLR 22 with the mobile station's MIN, updated CCM, and MSC-ID. The program then returns to step 51 (FIG. 4A).

Figure 5:
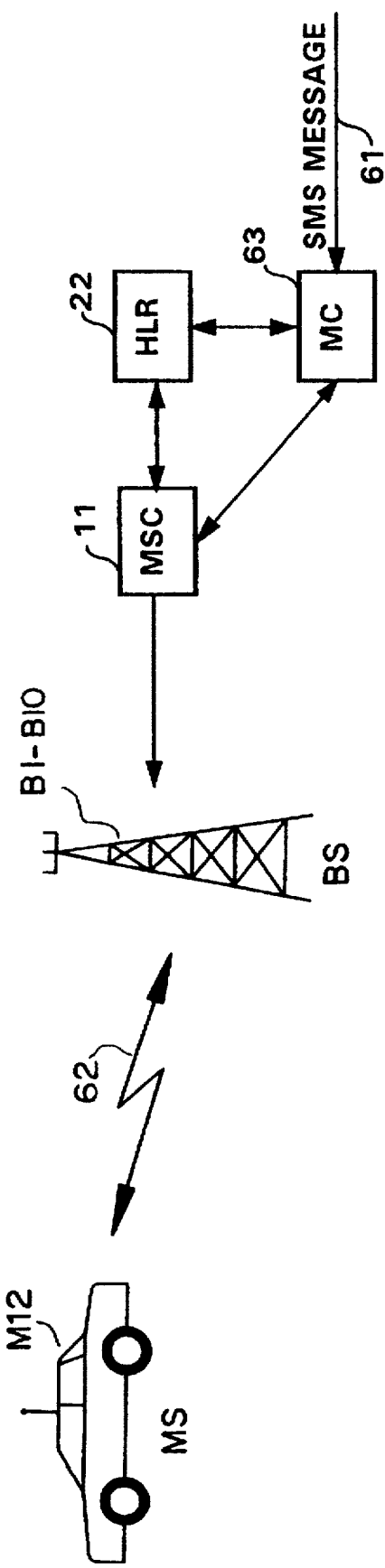
FIG. 5 is a high level block diagram of a portion of a cellular telecommunications network illustrating the delivery of a short message service (SMS) message to a mobile station in accordance with the teachings of the present invention.

FIG. 5 is a high level block diagram of a portion of a cellular telecommunications network illustrating the delivery of a short message service (SMS) message 61 to a mobile station M12 in accordance with the teachings of the present invention. In the scenario illustrated in FIG. 5, the mobile station M12 is operating on a DCC 62, and therefore, is capable of receiving SMS messages.

The SMS message 61 arrives at a message center (MC) 63 which stores the message until it can be forwarded to the MSC 11. The MC 63 queries the HLR 22 with a SMS Request Message to determine the CCM of the mobile station M12. The CCM is returned to the MC 63 which then determines whether or not to deliver the SMS message 61. If the CCM indicates that the mobile station M12 is operating in the analog mode, the SMS message cannot be delivered, and it is held in the MC 63. If the CCM indicates that the mobile station M12 is operating in the digital mode, then the MC 63 forwards the SMS message to the MSC 11, to the serving base station B1-B10, and over the DCC to the mobile station M12.

Alternatively, when the SMS message 61 arrives at the MC 63, the MC 63 queries the HLR 22 to determine whether or not to forward the message. In this embodiment, the HLR 22 determines whether or not the SMS message 61 can be delivered based upon the CCM of the mobile station M12. The HLR 22 then instructs the MC 63 to hold the message if the CCM indicates that the mobile station M12 is operating in the analog mode. The HLR 22 instructs the MC 63 to forward the SMS message to the MSC 11 if the CCM indicates that the mobile station M12 is operating in the digital mode. The message is then routed to the mobile station M12 via the serving base station B1-B10.

In either embodiment, if the CCM is initially analog, or the mobile station is inactive, and the CCM later changes to digital, an SMS Notification message is sent from the HLR 22 to the MC 63 indicating the control channel change. The MC then retrieves the stored SMS message and sends it to the MSC 11, to the serving base station B1-B10, and over the DCC to the mobile station M12.

Figure 6:
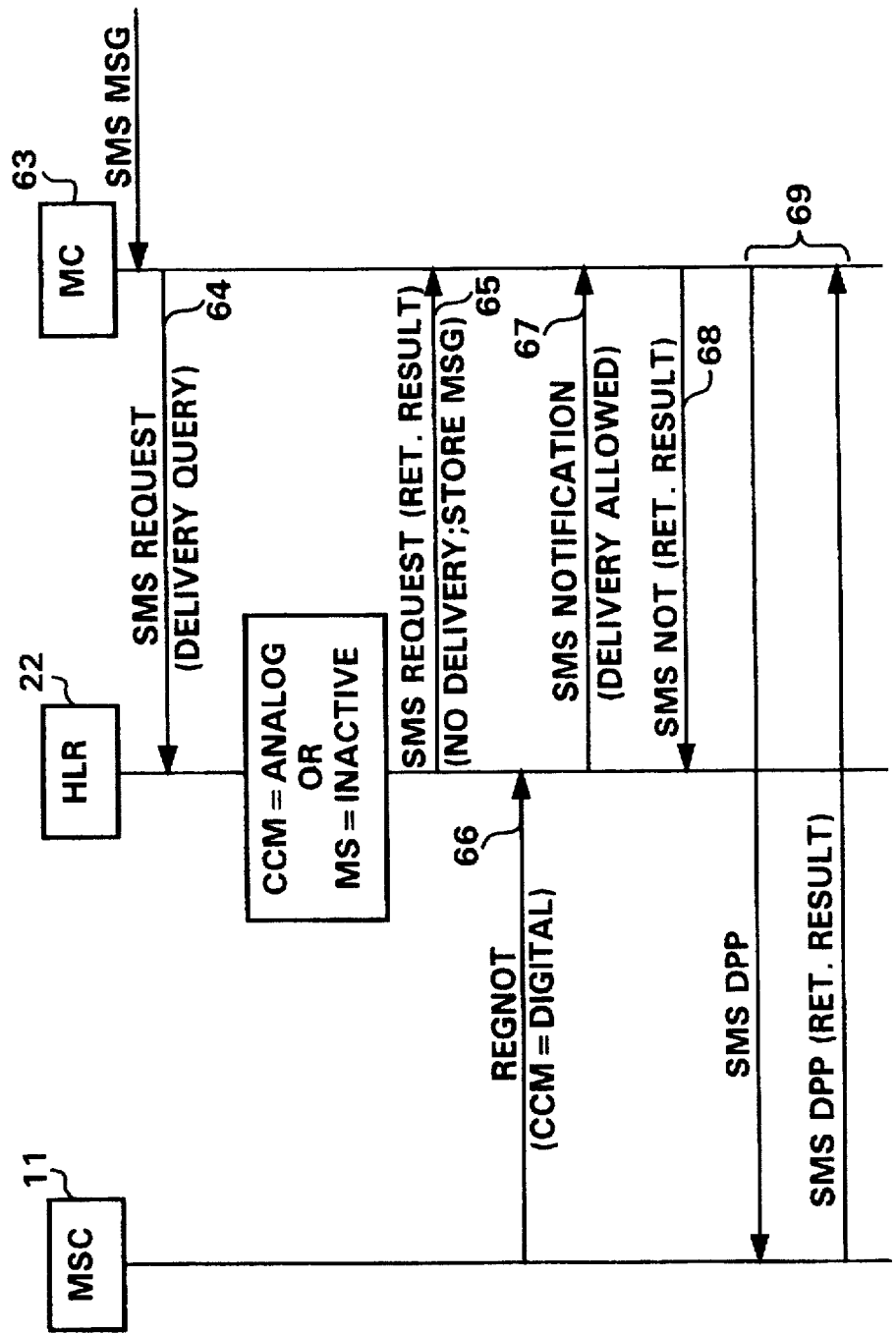
FIG. 6 is a message flow diagram illustrating the message flow between a mobile switching center, a home location register, and a SMS message center when an SMS message cannot initially be delivered to a mobile station, but delivery is later allowed.

FIG. 6 illustrates the message flow between the MSC 11, HLR 22, and MC 63 when an SMS message cannot initially be delivered to the mobile station M12, but delivery is later allowed. Following the receipt of an SMS message at the MC 63, the MC sends a SMS Request message 64 to the HLR 22 querying whether the SMS message can be delivered to the mobile station M12. In the example illustrated in FIG. 6, the message cannot initially be delivered because the CCM of the mobile station is either analog, or the mobile station is inactive. Therefore, the HLR returns a SMS Request Return Result message 65 to the MC indicating that the SMS message cannot be delivered and must be stored in the MC. The HLR keeps track of the fact that there is a SMS message that is awaiting delivery to the mobile station M12.

At a later time, the mobile station either switches from an analog to a digital control channel, or becomes active and is assigned a digital control channel. At that time, a RegNot message 66 is sent from the MSC 11 to the HLR 22 indicating that the CCM is digital. The HLR recognizes that the SMS message stored in the MC 63 can now be delivered. The HLR, therefore, sends a SMS Notification message 67 to the MC indicating that delivery is allowed. The MC returns a SMS Notification Return Result message 68 to the HLR and then sets up a SMS Delivery Point-to-Point (SMSDPP) 69 in the standard manner.

FIG. 7 is a message flow diagram illustrating the messages sent and received between a MSC 71, a VLR 72, and a HLR 73 when the mobile station M11 roams into a visited system comprising the MSC 71 and the VLR 72. In this embodiment, the MSC and the VLR are separate entities and are not combined in a V-MSC. At 74, the MSC 71 sends a Registration Notification (RegNot) message to the VLR 72 and includes the CCM of the mobile station M11. At 75, the VLR 72 forwards the RegNot message and CCM to the HLR 73. These messages are acknowledged in RegNot Return Result messages at 76 and 77. Thereafter, whenever the CCM changes, the MSC 71 sends a RegNot message to update the CCM in the VLR 72. The VLR 72 may store the CCM without updating the HLR 73, or preferably, may also update the HLR. Storing the CCM in the VLR 72 without updating the HLR 73 reduces signal traffic and memory requirements in the HLR, but has drawbacks as well. For example, although storing the CCM in the VLR makes the CCM available to the MSC for paging purposes, this solution does not enable a message center interfacing with the HLR to obtain the CCM information and ascertain whether a SMS message can be sent to the mobile station.

Additionally, in some network implementations such as, for example, a combined MSC/VLR (V-MSC), a failure of the MSC 71 may result in a corresponding failure of the VLR 72 and loss of the CCM information. Therefore, in the preferred embodiment of the present invention, the CCM information is stored in both the VLR 72 and the HLR 73.

Still referring to FIG. 7, it is shown at 78 that CCM information may be lost at the MSC 71. If there are no incoming calls for mobile station M11, the MSC takes no action, but waits for the next registration by the mobile station. The registration message includes the CCM of the mobile station and restores this information to the MSC. If there is an incoming call for the mobile station M11 before the next registration, then the MSC 71 must retrieve the CCM information from the VLR 72. In the embodiment illustrated in FIG. 7, a Location Request (Invoke) message 79 representing an incoming call for the mobile station M11 is received at the HLR 73. The HLR transmits a Route Request (Invoke) message 81 to the VLR which forwards the message at 82 to the MSC 71 requesting that the MSC page and locate the mobile station M11. However, the MSC is lacking the CCM information for the mobile station. Therefore, the MSC 71 sends a Qualification Request (Invoke) message 83 to the VLR 72 requesting CCM information for the mobile station. Since the MSC and the VLR are separate entities in FIG. 7, the VLR will probably still have the CCM and will return it to the MSC in a Qualification Request (Return Result) message at 84. Although not illustrated in FIG. 7, the MSC 71 then pages and locates the mobile station and returns a Route Request (Return Result) message to the VLR 72 which is forwarded to the HLR 73. The HLR then returns a Location Request (Return Result) message to the calling exchange.

Alternatively, if a call is received for the mobile station and both the MSC 71 and the VLR 72 have lost the CCM data as illustrated at 85, then the MSC sends a Qualification Request (Invoke) message to the VLR at step 86 which is forwarded to the HLR at step 87. The HLR then returns the CCM information in a Qualification Request (Return Result) message to the VLR at 88 which is forwarded to the MSC at 89.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method of maintaining control channel mode (CCM) status information for a mobile station in a cellular telecommunications network having a mobile switching center (MSC) and a home location register (HLR), said method comprising the steps of:

storing said CCM status information in said MSC, whenever said MS registers and whenever said MS changes control channel modes;

storing said CCM status information in said HLR, whenever said MS changes control channel modes;

determining whether said CCM status information has been lost by said MSC;

receiving an incoming call for said mobile station;

determining whether said incoming call is received after said CCM status information has been lost by said MSC; and retrieving said CCM status information from said HLR upon determining that said incoming call is received after said CCM status information is lost by said MSC and before said CCM status information is restored to said MSC by a registration message from said mobile station.

2. A system for maintaining control channel mode (CCM) status information for a mobile station in a cellular telecommunications network having a mobile switching center (MSC) and a home location register (HLR), said system comprising:

means for storing said CCM status information in said MSC;

means for storing said CCM status information in said HLR;

means for determining whether said CCM status information has been lost by said MSC;

means for receiving an incoming call for said mobile station;

means for determining whether said incoming call is received after said CCM status information has been lost by said MSC; and means for retrieving said CCM status information from said HLR upon determining that said incoming call is received after said CCM status information is lost by said MSC and before said CCM status information is restored to said MSC by a registration message from said mobile station.

3. A method of maintaining control channel mode (CCM) status information for a mobile station in a cellular telecommunications network having a mobile switching center (MSC), a home location register (HLR), and a plurality of cells, said CCM status information identifying whether said mobile station is operating on a digital control channel or an analog control channel, said method comprising the steps of:

transmitting a MS-BS registration message from said mobile station to a serving base station, said MS-BS registration message including a mobile identification number (MIN) for said mobile station;

transmitting a BS-MSC registration message from said serving base station to said MSC, said BS-MSC registration message including said MIN, said CCM status information for said mobile station, and a base station identification for said serving base station;

storing said CCM status information in said MSC;

determining whether said mobile station registered in said MSC before said mobile station transmitted said MS-BS registration message;

transmitting the MIN of said mobile station, the CCM of said mobile station, and a MSC identification from said MSC to said HLR upon determining that said mobile station did not register in said MSC before said mobile station transmitted said MS-BS registration message;

determining, upon determining that said mobile station registered in said MSC before said mobile station transmitted said MS-BS registration message, whether CCM information for said mobile station previously stored in said MSC is equal to the CCM information transmitted in said BS-MSC registration message; and transmitting an update message to said HLR upon determining that previously stored CCM information for said mobile station is not equal to the CCM information transmitted in said BS-MSC registration message.

4. The method of maintaining control channel mode (CCM) status information for a mobile station in a cellular telecommunications network of claim 3 wherein said step of transmitting an update message to said HLR includes transmitting said mobile station's MIN, the CCM information transmitted in said BS-MSC registration message, and the MSC identification.

5. A method of maintaining control channel mode (CCM) status information for a mobile station in a cellular telecommunications network having a mobile switching center (MSC), a home location register (HLR), and a plurality of cells, said CCM status information identifying whether said mobile station is operating on a digital control channel or an analog control channel, said method comprising the steps of:

transmitting a registration message from said mobile station to a serving base station, said registration message including a mobile identification number (MIN) for said mobile station;

determining in said MSC, the CCM status information of said mobile station;

storing said CCM status information in said MSC;

determining whether said mobile station registered in said MSC before said mobile station transmitted said registration message;

transmitting the MIN of said mobile station, the CCM of said mobile station, and a MSC identification from said MSC to said HLR upon determining that said mobile station did not register in said MSC before said mobile station transmitted said registration message;

determining, upon determining that said mobile station registered in said MSC before said mobile station transmitted said registration message, whether CCM status information for said mobile station previously stored in said MSC is equal to the CCM status information determined in said MSC; and transmitting an update message to said HLR upon determining that previously stored CCM status information for said mobile station is not equal to the CCM status information determined in said MSC.

6. A method of selecting control channels and maintaining control channel mode (CCM) information for a mobile station in a cellular telecommunications network having a mobile switching center (MSC), a home location register (HLR), and a plurality of cells that provide through associated base stations control channel state information, said CCM information identifying whether said mobile station is operating on a digital control channel or an analog control channel, said method comprising the steps of:

selecting at said mobile station, a new cell;

determining at said mobile station whether digital operation is allowed in said mobile station;

selecting at said mobile station, an analog control channel upon determining that digital operation is not allowed in said mobile station;

determining from said control channel state information, whether a digital control channel is available in said selected cell;

selecting at said mobile station, an analog control channel upon determining that a digital control channel is not available in said selected cell;

selecting at said mobile station, a digital control channel upon determining that digital operation is allowed in said mobile station and said digital control channel is available in said selected cell;

transmitting a mobile identification number (MIN) for said mobile station from said mobile station to said serving base station;

transmitting said MIN, the CCM in which the mobile station is currently operating, and a base station identification from said serving base station to said MSC;

determining whether said MSC already had CCM information stored for said mobile station;

transmitting, upon determining that said MSC did not already have CCM information stored for said mobile station, the MIN of said mobile station, the current CCM of said mobile station, and a MSC identification from said MSC to said HLR;

determining, upon determining that said MSC already had CCM information stored for said mobile station, whether CCM information for said mobile station already stored in said MSC is equal to the current CCM; and transmitting, upon determining that the CCM information for said mobile station already stored in said MSC is not equal to the current CCM, the MIN of said mobile station, the current CCM of said mobile station, and said MSC identification to said HLR.

7. A method of delivering a short message service (SMS) message to a mobile station in a cellular telecommunications network having a mobile switching center (MSC), a home location register (HLR), and a message center (MC), said method comprising the steps of:

storing in said HLR, a current control channel mode (CCM) indicating whether said mobile station is operating on a digital control channel or an analog control channel;

receiving at said MC, said SMS message for said mobile station;

transmitting a request for said mobile station's CCM from said MC to said HLR;

transmitting said CCM from said HLR to said MC;

determining in said MC, whether or not said CCM indicates that said mobile station is operating on a digital control channel;

storing said SMS message in said MC upon determining that said CCM indicates that said mobile station is not operating on a digital control channel; and transmitting said SMS message to said MSC for delivery to said mobile station upon determining that said CCM indicates that said mobile station is operating on a digital control channel.

8. A method of delivering a short message service (SMS) message to a mobile station in a cellular telecommunications network having a mobile switching center (MSC), a home location register (HLR), and a message center (MC), said method comprising the steps of:

storing in said HLR, a current control channel mode (CCM) indicating whether said mobile station is operating on a digital control channel or an analog control channel;

receiving at said MC, said SMS message for said mobile station;

transmitting a query from said MC to said HLR to determine whether or not to forward the message;

determining in said HLR, whether or not said SMS message can be delivered based upon the CCM of the mobile station;

instructing the MC to store said SMS message upon determining that the CCM indicates that said mobile station is operating on said analog control channel;

storing said SMS message in said MC upon receiving instructions from said HLR to store said message;

instructing the MC to forward said SMS message to said MSC upon determining that the CCM indicates that said mobile station is operating on said digital control channel; and transmitting said SMS message to said MSC for delivery to said mobile station upon receiving instructions from said HLR to forward said message.

9. The method of delivering a short message service (SMS) message to a mobile station of claim 8 wherein the step of storing a current control channel mode (CCM) in said HLR includes updating said stored CCM whenever said mobile station changes its control channel mode.

10. The method of delivering a short message service (SMS) message to a mobile station of claim 9 further comprising the step of instructing the MC to forward said SMS message to said MSC whenever said CCM changes to digital.

11. A method of maintaining control channel mode (CCM) status information for a mobile station in a cellular telecommunications network having a mobile switching center (MSC), a visitor location register (VLR), and a home location register (HLR), said CCM status information identifying whether said mobile station is operating on a digital control channel or an analog control channel, said method comprising the steps of:

determining whether said mobile station is operating in said MSC;

transmitting said CCM status information from said MSC to said VLR and said HLR upon determining that said mobile station is operating in said MSC;

transmitting, upon change of said CCM status information, new CCM status information from said MSC to said VLR and said HLR;

determining that said CCM status information has been lost by said MSC;

determining whether said CCM status information has been lost by said VLR;

retrieving said CCM status information from said VLR and providing said CCM status information to said MSC upon determining that said CCM status information has not been lost by said VLR; and retrieving said CCM status information from said HLR and providing said CCM status information to said VLR and said MSC upon determining that said CCM status information has been lost by said VLR.

12. A method of paging a mobile station (MS) in a cellular telecommunications network having a mobile switching center (MSC) and a home location register (HLR), said method comprising the steps of:

storing control channel mode (CCM) status information in said MSC, whenever said MS registers and whenever said MS changes control channel modes;

storing said CCM status information in said HLR, whenever said MS changes control channel modes;

determining whether said CCM status information has been lost by said MSC;

receiving an incoming call for said mobile station;

determining whether said incoming call is received after said CCM status information has been lost by said MSC;

retrieving said CCM status information from said HLR upon determining that said incoming call is received after said CCM status information is lost by said MSC and before said CCM status information is restored to said MSC by a registration message from said mobile station; and paging said mobile station on a type of control channel indicated by said retrieved CCM status information.

* * * * *